Dec. 14, 1937.   L. J. ANDRES   2,101,890
PROJECTOR
Filed May 14, 1934   2 Sheets-Sheet 1
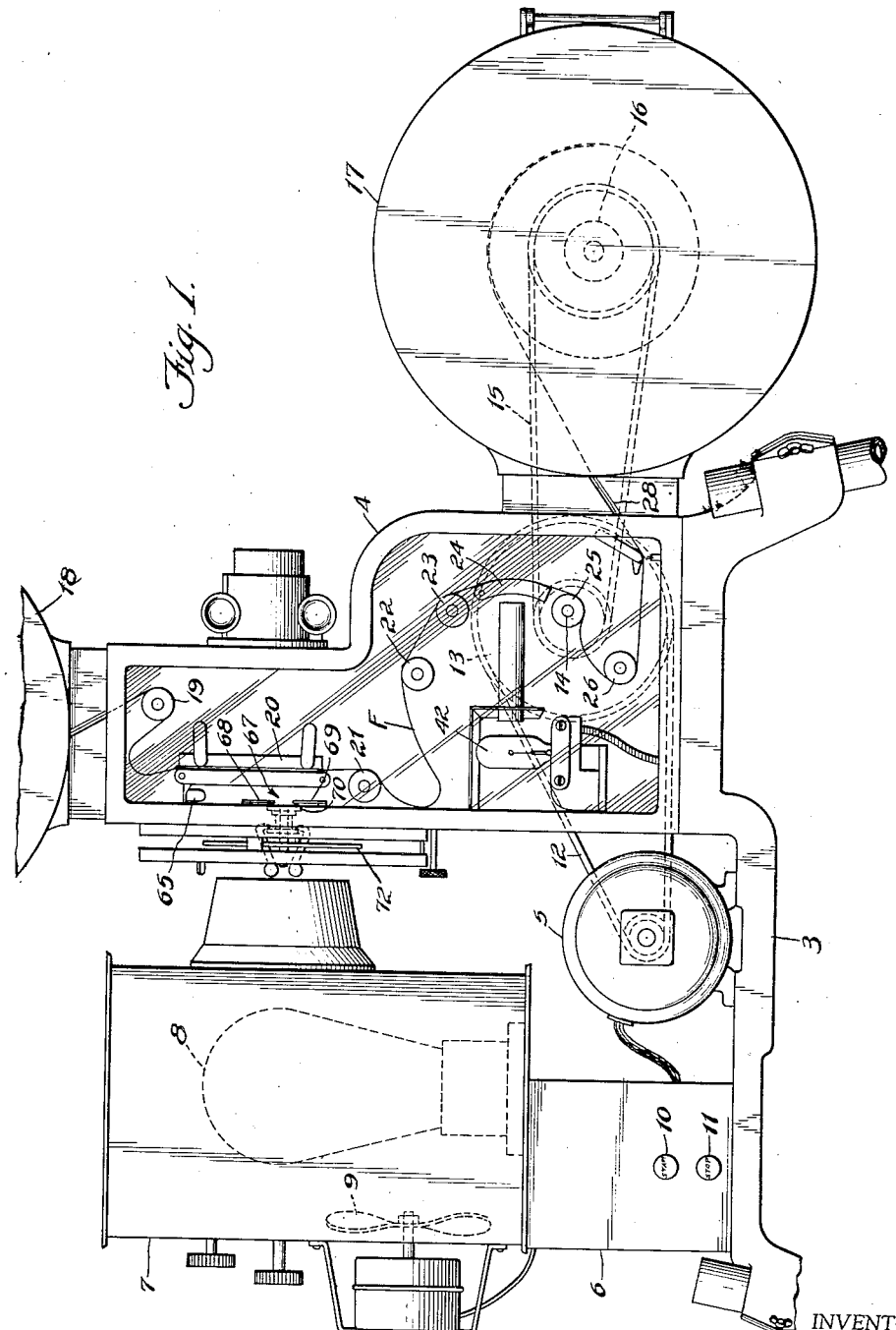
INVENTOR.
Lloyd J. Andres
BY John E. Titus
ATTORNEY.

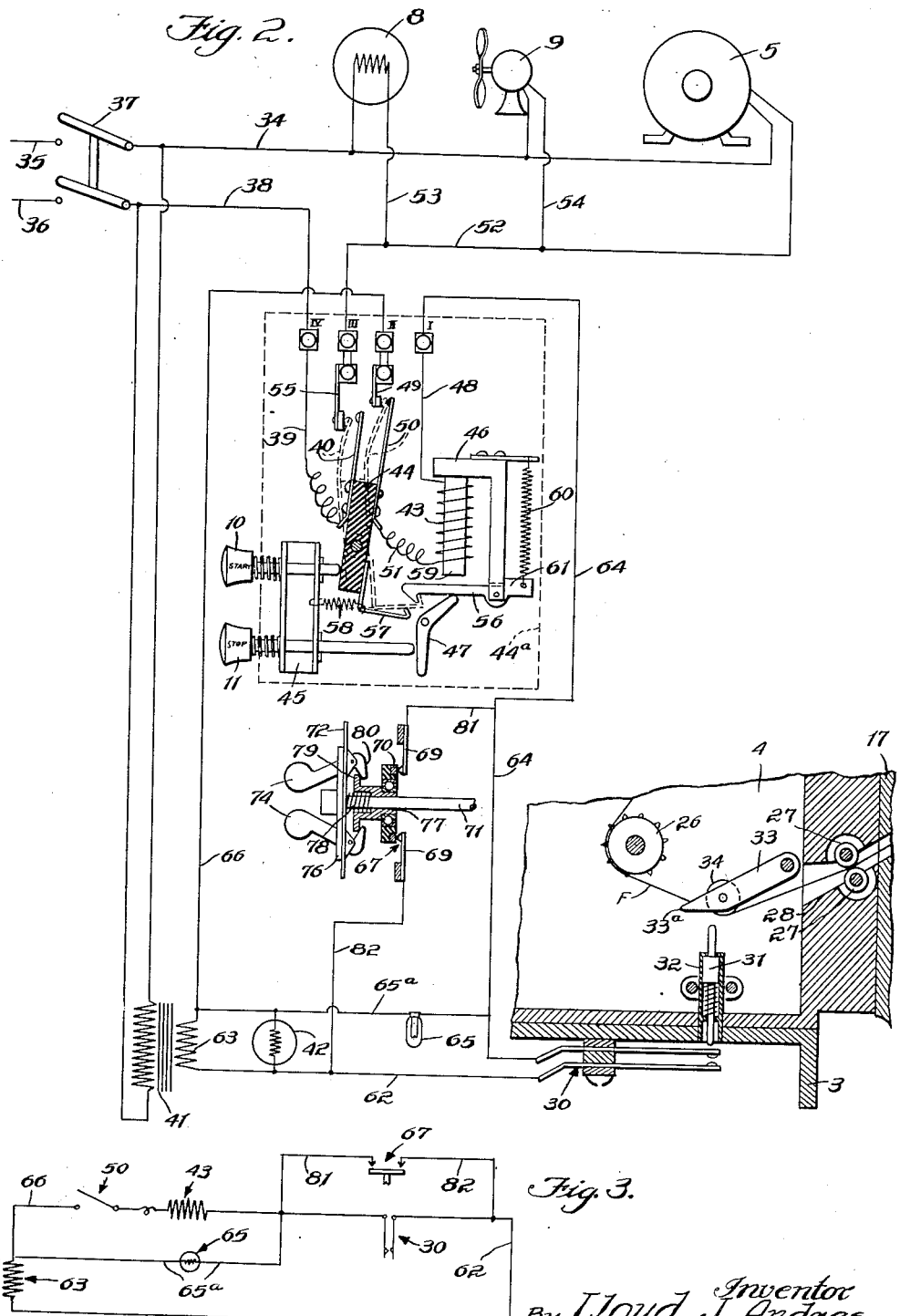

Patented Dec. 14, 1937

2,101,890

UNITED STATES PATENT OFFICE 2,101,890

PROJECTOR

Lloyd J. Andres, Grand Rapids, Mich., assignor to Automatic Instrument Company, a corporation of Michigan Application May 14, 1934, Serial No. 725,470

6 Claims. (Cl. 88—17)

This invention relates to motion picture and sound picture projectors; and more particularly to the provision of safety means therefor.

Objects of this invention are to provide a projector for handling celluloid film, which is simple and safe to operate and especially fitted for schools, lecture work, and the like.

A main fire hazard in such apparatus arises from the liability of the film being ignited by the heat of the projector lamp. Under normal operating conditions means may be provided for protecting the film from the heat when the film is moving rapidly through the light beam; but if the film stops moving for any reason, it is apt to be quickly damaged or ignited.

Accordingly, in this invention, means are provided for shutting off the lamp in case the movement of the film is retarded by failure in the mechanical driving parts, such as abnormal friction in the bearings, failure of the driving mechanism, a burnt out or defective motor, belt failure, and the like. Also means are provided for stopping the motor and opening the lamp circuit in case the film breaks.

The latter means is also effective for stopping the machine when the film is exhausted. Another object is to facilitate the re-threading of the film, a lamp being provided which is automatically lighted by the safety stop means to illuminate the film track.

Other objects are to provide a starting switch mechanism which will not remain closed unless and until the machine reaches the running speed and the operator cannot leave the machine operating without all conditions being correct.

Another object is to provide such a mechanism in which no relays are energized while the machine is in operation so that there will be no interference with the sound reproduction when alternating current is used.

Other objects and advantages will become apparent in the following description, taken with reference to the accompanying drawings, in which the invention is shown incorporated in a sound picture projector, such as is disclosed in my patent application, Serial Number 716,595, filed March 31, 1934, in which the machine itself is more fully shown and described.

Fig. 1 is a side elevation of the projector, with some of the concealed parts of particular interest indicated in broken lines.

Fig. 2 is a diagram showing parts and portions of the machine housing in section, and the electrical mechanism and circuits therefor.

Fig. 3 is a straight line diagram of the control circuits.

As shown in Fig. 1, the projector comprises a base 3 on which is mounted a projector housing 4; a driving motor 5; and a starting switch mechanism box 6, on which is mounted a lamp housing 7, containing a projector lamp 8. A fan 9 is provided for cooling the lamp by circulating air through the housing 7.

A starting button 10 and a stop button 11 project from the box 6; and the motor is connected by a belt 12 to a main drive fly wheel pulley 13, mounted on a sound drive sprocket wheel shaft 14 in the projector housing. The pulley 13 is connected by a belt 15 for driving a take-off reel 16 which is contained in a housing or casing 17 mounted on the front of the projector housing.

The film F is drawn out of the roll casing 18 and into the housing 4 by positively driven sprocket wheels 19; through the aperture plate 20 by the intermittent drive pulleys 21; through a loop by positively driven sprockets 22; and over tension sprockets 23 and a sound take-off aperture plate 24, by constantly driven sprockets 25 mounted on the shaft 14. Then, from the sound drive sprockets, the film passes over a pair of positively driven hold-back sprockets 26; and is pulled out, over guide rollers 27, mounted in the outlet slot 28 to the housing 17, and wound up on the frictionally driven take-off reel 16.

Referring to the cross section of the lower portion of the projector housing shown in Fig. 2, a spring finger safety switch 30 is mounted on the under side of the top portion of the base 3; and a spring lifted plunger 31 is slidably mounted in a casing 32 which is fixedly mounted on the wall of the projector housing 4. The plunger casing is open at the bottom and projects through the adjacent walls of the housing and base, so that, when the plunger is depressed, it presses the fingers of the switch 30 into contact and thus closes the switch.

An arm 33 is provided which is pivotally mounted on the back wall of the housing 4, and is positioned so that its movable end 33a will rest on and depress the plunger 31. This arm carries a roller 34 which rests on the free stretch of the film between the sprockets 26 and the guide rollers 27 whereby the arm 33 is maintained in a raised position out of contact with the plunger 31 while the machine is running and the film is under tension, the arm being allowed to drop down and close the switch 30 when the film breaks, runs out, or otherwise loses its tension, as by failure of the belt 15.

Leads from one side of the motor 5, the projection lamp 8 and the cooling fan 9 are connected to a power lead wire 34 which is connected to one of a pair of power lines 35 and 36, through a suitable double pole plug-in or knife switch 37. The opposite power line is connected through the switch 37 to a power lead 38 which runs to a binding post IV, and hence through a flexible wire 39, to a contact finger 40. Connected across the power leads 34 and 38, is a transformer 41 for supplying low voltage current to excite the sound take off lamp 42 and for operating a relay 43.

The starting switch comprises an insulating switch block 44 which is rotatably mounted on a suitable base 44a, on which is fixedly mounted a guide bracket 45, in which the push buttons 10 and 11 are slidably mounted, and the frame 46 of the relay 43. Binding posts I, II, III, and the post IV, are fixedly mounted on the switch base member 44a; and a weighted trigger 47 is rotatably mounted on the base and situated below the relay frame.

Binding post I is connected by wire 48 to one side of the relay winding; and the binding post II is provided with a stationary contact point 49, in cooperative relation with a relay switch contact finger 50 which is mounted on one side of the switch block 44 and connected by a flexible wire 51 to the opposite terminal of the relay 43. The binding post III is joined by wire 52 and branch wires 53 and 54 to the open terminals of the lamp 8, fan 9, and motor 5; then this post has a stationary contact member 55 which cooperates with the switch finger 40, this finger being mounted on the block 44 on its side opposite the finger 50. Thus rotating the switch arm block 44, by depressing the starting button 10, closes the motor, lamp, and fan circuits; and also closes the relay switch which comprises the contact 49 and finger 50, the finger 50 being lengthened so that it remains in contact after the motor switch finger 40 when the switch arm block 44 returns to open position.

In running condition the switch block 44 is locked in closed position by means of a latch 56 which is engaged by a hook 57, attached to the lower end of the block 44; and the block is urged to rotate into open position by a spring 58 which is extended between the hook member 57 and the bracket 45. To open the switch at will, the operator depresses the "stop" button 11, and this rotates the trigger 47 into contact with and to raise and disengage the latch from the hook. The latch 56 is rotatably mounted on the relay frame and is urged to rotate away from the relay pole 59 by a spring 60. A stop shoulder 61 is provided on the latch member which abuts against the relay frame and limits its outward movement.

One finger of the safety switch 30 is joined by the wire 62 to one side of the secondary 63 of the transformer 41; and the other finger of the switch 30 is connected by wire 64 to the binding post I, and hence to the relay 43 by wire 48.

Thus when the switch 30 is closed while the starting switch is in closed position, the relay is energized to attract and release the latch and allow the main switch to open, under the action of the spring 58.

This also lights a threading lamp 65 which is included in a connection 65a which extends from wire 64 to wire 66 so that the lamp is automatically lighted to illuminate the interior of the housing for rethreading the film when the switch 30 is closed.

For opening the projection lamp and motor circuits when the speed of the film falls below the running speed, I provide a governor operated safety switch 67 comprising two insulated contact fingers, 68 and 69, mounted on the wall of the housing 4, and a contact ring 70 which is slidably mounted on the shaft 71 of the shutter 72. The shutter is mounted on the outer surface of the rear wall of the housing, and is connected by the train of gearing to the driving pulley 13, as described in particular in said application. The gear train also includes means for driving the sprockets, as mentioned; and the shutter is at the end of the train. Accordingly the shutter is the first to be affected by failure in the drive.

A pair of governor weight arms 74 are pivotally mounted on the hub 75 of the shutter; and the ring 70 is rotatably mounted on and insulated from a sleeve 77 which is slidably mounted on the shutter shaft; and the sleeve is urged to move the ring into contact with the fingers 68 and 69, to close the switch, by a compressed spring 78. The rear end of the sleeve 77 is provided with a circular flange 79 which engages behind hooked portions 80 of the governor weights. Therefore, when the machine is running and the shutter is rotating at the correct running speed, the weights pull the sleeve out against the action of the spring 78 and move the contact ring away from the fingers, and thus open the switch 67.

The finger 68 is joined by wire 81 to the relay connection wire 64; and the finger 69 is connected by wire 82 to the transformer lead 62. Hence the switch 67 is normally closed, and the relay will remain energized to prevent locking the starting switch until the running speed is reached.

To review the operations, the power leads 34 and 38 being connected to the power supply line, the film is threaded and the starter button 10 is depressed. This rotates the switch block 44 into closed position against the action of the spring 58. Before the latch becomes engaged with the hook 57, contact is made between the relay switch finger 50 and the contact to energize the relay 43, through the following circuit,—From transformer secondary 63; wire 66; binding post II; contact 49; finger 50; flexible wire 51; relay 43; wire 48; binding post I; wires 64 and 81; through the closed switch 67 and wire 82 to the opposite side of the transformer. This causes the relay to attract and raise the latch 56, and the button 10 must be held depressed until the film is traveling at operating speed at which the governor opens the switch 67.

The lamp 65 is excited through the switch 67 until this switch is opened. Accordingly the lamp gives an indication as to when the running speed is reached and the button may be released.

As soon as the film is under tension the weight arm 33 is lifted and the switch 30 allowed to open. This will occur as soon as the film starts in motion, and the governor finally determines the time for de-energizing the relay and permitting the latch to drop and lock the switch block 44 in closed position.

Accordingly with the machine operating under normal running conditions both safety relay switches 67 and 30 are maintained in open condition. Then if the film breaks or runs out, with the machine running at full speed, the weight arm falls and the switch 30 is closed to energize the relay and release the latch, opening the main switch, and relighting the lamp 65.

In case the operator desires to discontinue the operation of the machine before the end of the film is reached, he depresses the "stop" button. This rotates the trigger 47 to lift the latch and disengage it from the hook 57.

Manifestly, by the use of this invention, the projector lamp circuit is opened at once when the speed of the film is retarded from mechanical trouble, by the governor; and in case the film breaks, by the weight arm 33; the operator is unable to get the machine started to running by itself unless all conditions are correct; a visible signal is given of subnormal operation; the machine is stopped if the film is not traveling properly through the housing; and the rethreading is facilitated by the automatic lighting of the threading lamp.

Having thus described my invention, I claim:

1. In a motion picture machine having a film driving motor and a projector lamp, an unlocking relay, manually operable switch means for energizing said three elements, automatic means for locking said means in closed position and unlocking it, a governor operated by the motor, a film safety switch, a film threading lamp connected in parallel with the relay and lighted when the said switch means is closed, and means operated by the governor for maintaining the relay de-energized and ineffective and the film threading lamp unlighted at the operating speed unless the film safety switch is closed.

2. In a motion picture machine having a main circuit including a film driving motor and projection lamp, a pivotally mounted block having a contact finger for energizing the main circuit and having a relay contact finger, a spring for urging the block to rotate and move the contact fingers into open position, a push button for moving the block to closed contact position and for holding it in closed position until the motor attains the normal speed, a latch for holding the block in closed position, a relay energized by the relay contact finger, means controlled by the machine for de-energizing the relay under normal operation conditions, and a push button for manually releasing the latch to stop the machine at will.

3. In a motion picture machine, starting means comprising a double switch having a main contact for operating the machine and having a relay contact, a spring for opening the switch, manually operable means for closing the switch to start the machine and for holding the switch closed until the machine attains normal speed, a latch for holding the switch closed, a relay for releasing the latch, the relay being energized through the relay contact of the switch, safety means operated by the machine to de-energize the relay when and while the machine is in normal operating condition, and manually operable means for releasing the latch to stop the machine at will.

4. In a motion picture machine, a spring opened main switch, a push button for moving the switch to and holding it in closed position to start the machine into operation, a latch for holding the switch closed, a relay for releasing the latch, a safety switch maintained in open position by the machine under normal operating conditions and allowed to close under subnormal conditions, a signal lamp within the machine which is automatically lighted to indicate the subnormal condition when the safety switch is closed, the relay being connected in series through the main switch and the safety switch, and a push button for releasing the latch to open the main switch at will.

5. In a motion picture machine having a film driving motor circuit and a projector lamp circuit, a manual starting switch for energizing said circuits, a latch for locking the switch in closed position, a relay for releasing the latch, a circuit for the relay including the starting switch, a governor operated by the motor having a switch normally closed in series with the relay circuit, a film tensioning means having a switch normally open but closed when the film tension fails, in a circuit parallel with the governor circuit, and a film threading lamp in a circuit in parallel with the relay circuit and these two circuits in series with the governor switch circuit and film tension switch circuit in parallel so that the threading lamp is lighted when the relay is energized either by the governor or by the film tensioning device.

6. In a motion picture machine, the combination with means for driving the film, a governor driven by said means, a projection lamp having a circuit, a manually operable switch for said circuit, a switch releasing relay, the relay and said switch being in a series circuit, a normally closed switch operated by the governor to de-energize the relay while the film is moving at a running speed, and a film threading lamp having a circuit in parallel with the circuit in which the manually operable switch and the relay are in series, and these parallel circuits being in series with the governor switch to light the threading lamp.

LLOYD J. ANDRES.